United States Patent
Makino et al.

(10) Patent No.: US 6,456,807 B1
(45) Date of Patent: Sep. 24, 2002

(54) ROTATION STABILIZING DEVICE

(75) Inventors: Toru Makino; Chohiko Fukuo; Jun Onishi; Taku Saito, all of Hachioji (JP)

(73) Assignee: Konica Corporation (JP)

( * ) Notice: Subject to any disclaimer, the term of this patent is extended or adjusted under 35 U.S.C. 154(b) by 0 days.

(21) Appl. No.: 09/586,497

(22) Filed: Jun. 2, 2000

(30) Foreign Application Priority Data

Jun. 3, 1999 (JP) ............................................. 11-156194

(51) Int. Cl.[7] .............................................. G03G 15/00
(52) U.S. Cl. ............................. 399/167; 74/574; 399/75
(58) Field of Search ........................... 399/117, 75, 167; 74/574

(56) References Cited

U.S. PATENT DOCUMENTS

| | | | | |
|---|---|---|---|---|
| 2,157,158 A | * | 5/1939 | Blessing et al. ........... | 74/574 X |
| 2,580,839 A | * | 1/1952 | Riopelle ..................... | 74/574 |
| 5,420,664 A | * | 5/1995 | Miwa et al. ................ | 399/167 |
| 5,881,342 A | * | 3/1999 | Makino et al. ............. | 399/167 |
| 6,006,882 A | * | 12/1999 | Fukushima ................ | 74/574 X |

FOREIGN PATENT DOCUMENTS

| JP | 7-140842 | * | 6/1995 |
| JP | 7-325445 | * | 12/1995 |
| JP | 2000-85206 | * | 3/2000 |

* cited by examiner

Primary Examiner—Joan Pendegrass
(74) Attorney, Agent, or Firm—Bierman, Muserlian and Lucas

(57) ABSTRACT

A rotation stabilizing device of the invention has therein a rotary member which rotates around the central rotation axis, an inertia member which is arranged at the position different from that for the royary member in terms of the axial direction of the central rotation axis, and a connecting member which is provided with a viscoelastic member having viscosity and elasticity and connects the rotary member and the inertia member in a detachable manner through the viscoelastic member, and is characterized in that the connecting member is provided at the position which is away from the central rotation axis in the radial direction.

9 Claims, 14 Drawing Sheets

INERTIA SECTION WITHOUT GROMMET

INERTIA SECTION WITH GROMMET

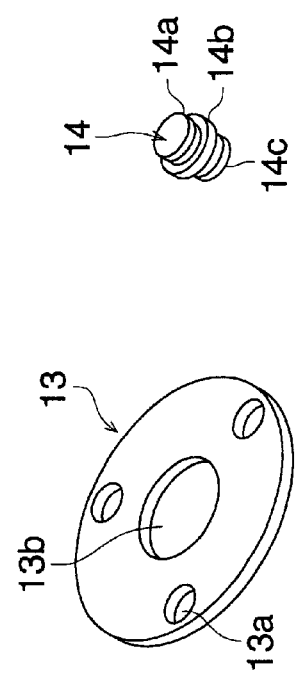
FIG. 5(a)
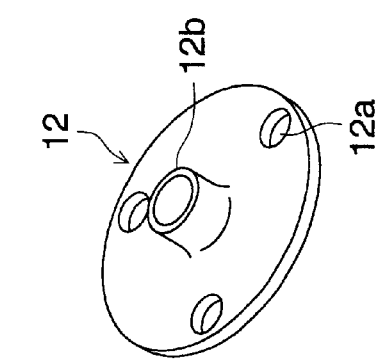
FIG. 5(b)
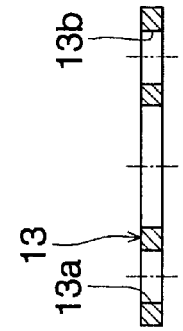
FIG. 5(c)
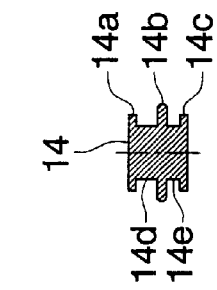
FIG. 5(d)
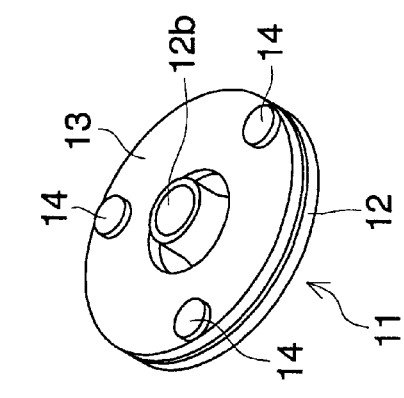
FIG. 5(e)
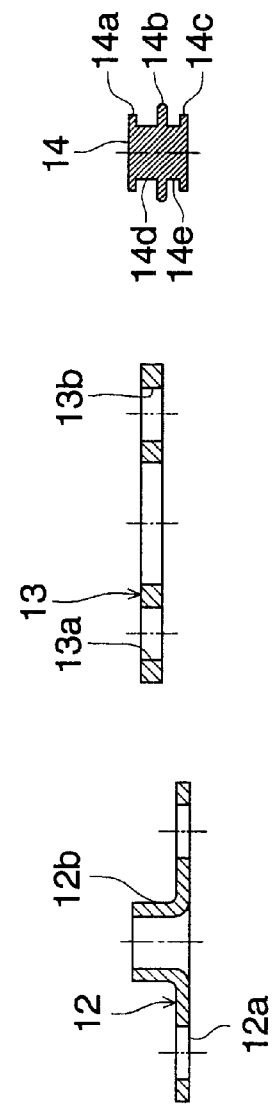
FIG. 5(f)
FIG. 5(g)
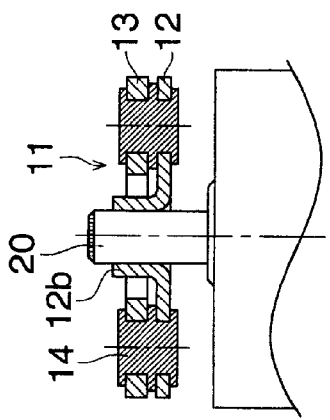
FIG. 5(h)

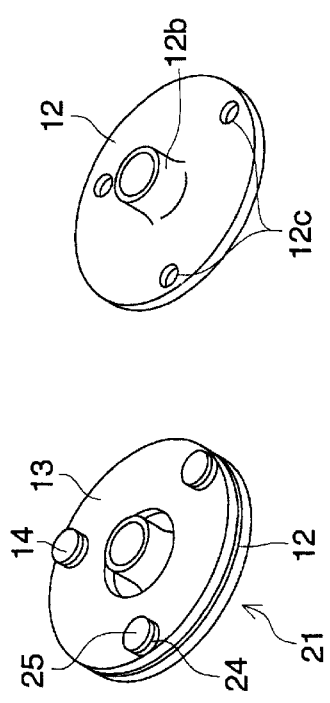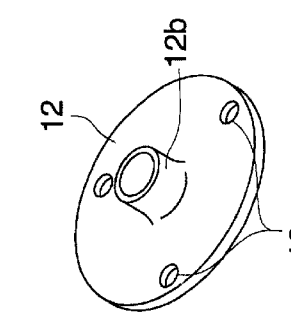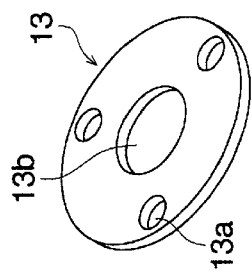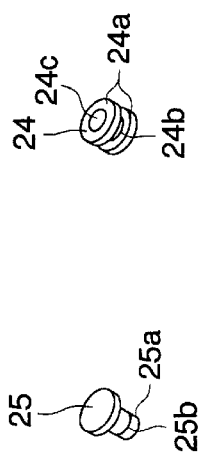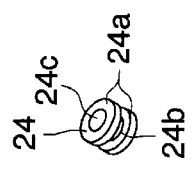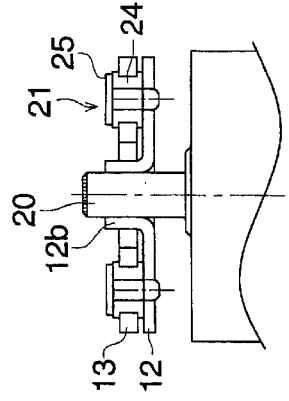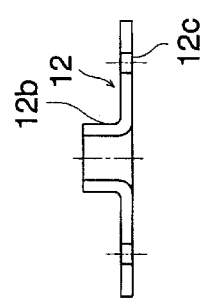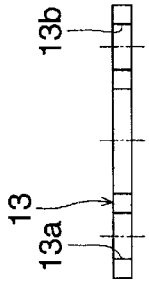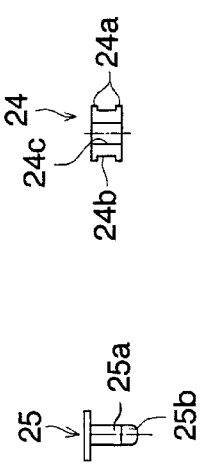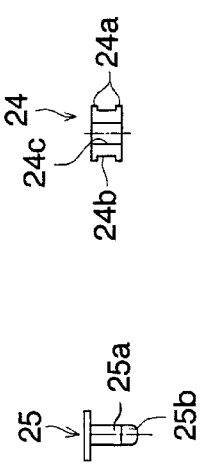

FIG. 9 (a)
FIG. 9 (b)
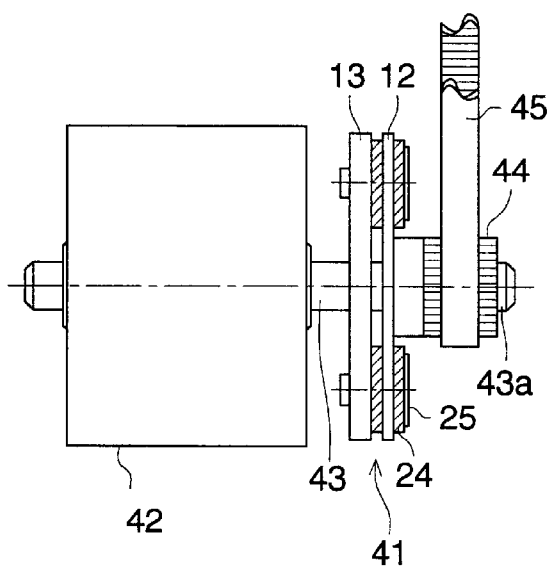
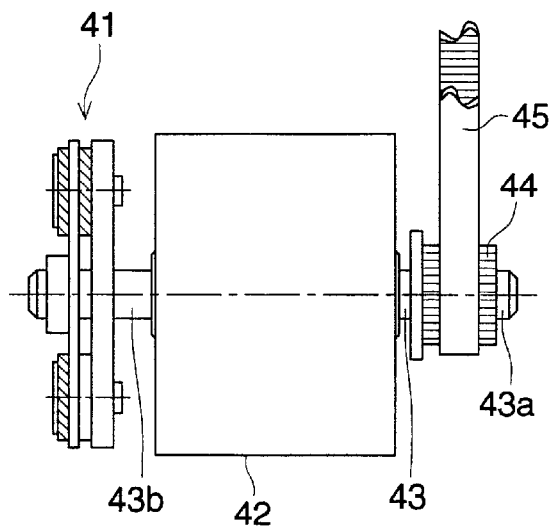

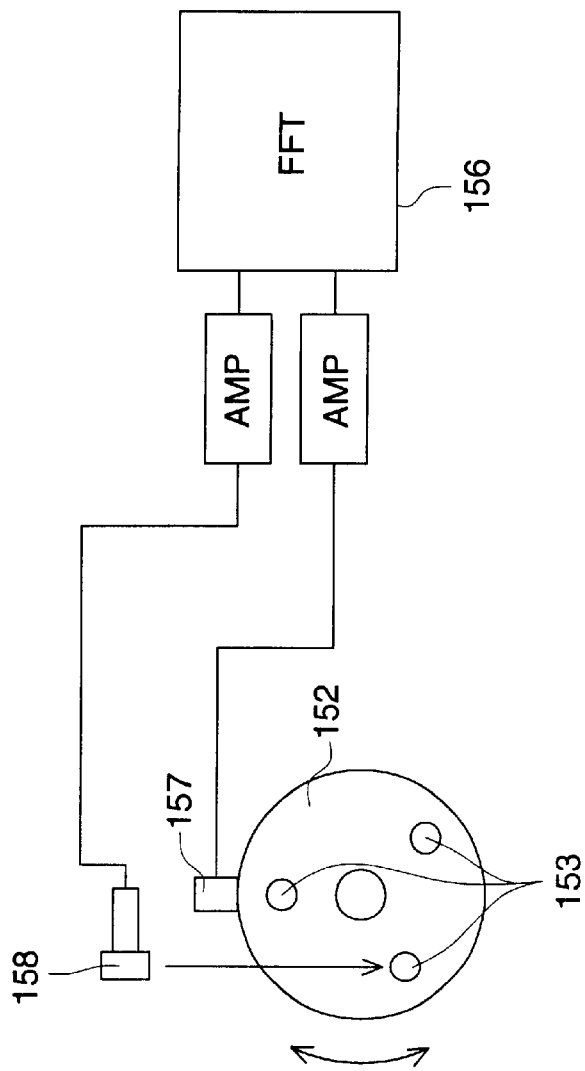
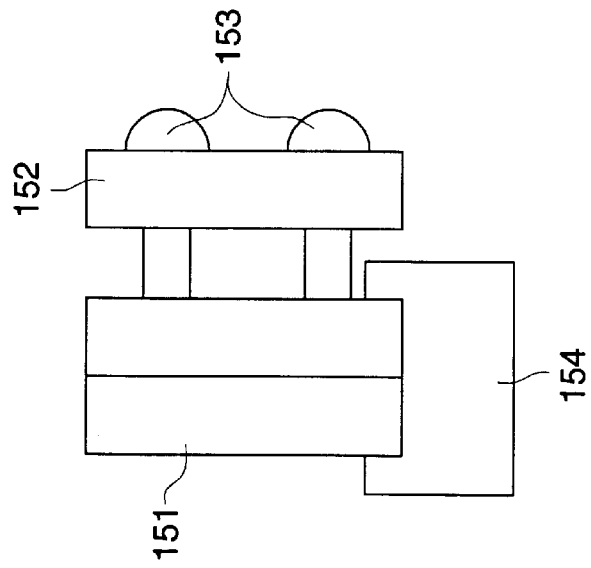

ROTATION STABILIZING DEVICE

BACKGROUND OF THE INVENTION

The present invention relates to a rotation stabilizing device deterring rotation fluctuation and thereby stabilizing the rotation, a rotation driving mechanism equipped with the rotation stabilizing device, and to an image forming apparatus and an image reading apparatus which can deter rotation fluctuation in an image carrier such as a photoreceptor drum.

In recent years, there are demands for the technology to stabilize driving in various technical fields. For example, in an image forming apparatus such as a copying machine, a developing agent, namely, toner is used for developing a latent image on a photoreceptor drum representing an image carrier. In general, toner is a powdery substance having a size of about 10 μm, and it is structured with resin and a magnetic substance, or with resin and an adhesive agent.

When forming an image, toner is adsorbed on a photoreceptor drum on which electric charges are accumulated, then, the toner is transferred onto paper representing an image forming object, and this toner is fixed on the paper by the use of a fixing roller. Toner which failed to be transferred and is remaining on a photoreceptor drum is removed from the photoreceptor drum by a scraping blade before succeeding electric charges are accumulated.

Incidentally, though torque transmitted through a driving system for rotating a photoreceptor drum is mostly constant, resistance of a scraping blade which comes in contact with an outer circumferential surface of the photoreceptor drum and scrapes toner off, for example, usually fluctuates irregularly. If this resistance increases, a rotating speed of the photoreceptor drum is low, while, if this resistance decreases, a rotating speed of the photoreceptor drum is high, thus, rotational fluctuation of the photoreceptor drum is intrinsically caused. When the rotational fluctuation is caused on the photoreceptor drum, an image is not formed uniformly, causing a fear of a decline of image quality.

For preventing rotational fluctuation of this kind, a fly wheel having the great moment of inertia is provided to be coaxial with the photoreceptor drum. Due to the great moment of inertia,: this fly wheel can absorb rotational fluctuation of the photoreceptor drum to a certain extent/

However, it was found that rotational fluctuation is still caused occasionally on the photoreceptor, even when a fly wheel having the great moment of inertia is provided. A fly wheel, a shaft connected to the photoreceptor drum and gears in a driving system form a torsional vibration system. In the torsional vibration system of this kind, there exists a natural frequency. Therefore, if resistance of a scraping blade which comes in contact with an outer circumferential surface of the photoreceptor drum, for example, generates vibratory force to start vibration at a frequency which is close to a natural frequency of the torsional vibration system, the so-called resonance phenomenon is caused on the torsional vibration system, and great torsional vibration is generated on the fly wheel. The torsional vibration of this kind causes rotational fluctuation of the photoreceptor drum and thereby affects adversely on image forming.

On the contrary, even if the moment of inertia of the fly wheel is further increased, the natural frequency still exists and it rather moves toward the low frequency side, and transmission magnification is increased, resulting in another trouble that resonance phenomenon tends to be caused.

Further, although the changing of torque from a driving system under an electronic control in accordance with fluctuation of resistance of a scraping blade can be considered, the control mechanism needs to be complicated and high-performance motors and expensive electronic parts are necessary, which increases cost of an image forming apparatus.

In addition, not only for the image forming apparatus, various technologies have been used as a stabilizing technology for driving of a body of rotation. For example, there is known a technology to arrange a damper for achieving stabilized driving of a motor. For example, Japanese TOK-KAISHO No. 61-9156 discloses a damper for a stepping motor wherein a flange section and an inertia body both fixed on a motor shaft are combined together through an elastic member. However, since an elastic body is stuck to the flange section and an inertia body through adhesives or baking, it is not possible to change a position, the number and materials of the elastic body, and it is also impossible to change dimensions and materials of the flange sections and inertia bodies, resulting in less versatility and low degree of freedom in use. Further, even if the elastic bodies and inertia bodies are deteriorated, they can not be replaced, and a damper needs to be replaced totally. Since those with a conventional structure lack versatility as stated above, other types are necessary to be prepared in advance, which causes additional cost.

SUMMARY OF THE INVENTION

In view of the problems in the prior art, it is an object to provide a rotation stabilizing device which is versatile for use and has high degree of freedom and deters rotation fluctuation to stabilize the rotation, and a rotation driving mechanism, an image forming apparatus and an image reading apparatus all being equipped with the rotation stabilizing device.

Another object of the invention is to provide an image forming apparatus wherein the structure is simple, and rotational fluctuation of a body of rotation such as a photoreceptor drum can be deterred.

To attain the objects stated above, a rotation stabilizing device of the invention has therein a rotary member which rotates around the central rotation axis, an inertia member which is arranged at the position different from that for the rotary member in terms of the axial direction of the central rotation axis, and a connecting member which is provided with a viscoelastic member having viscosity and elasticity and connects the rotary member and the inertia member in a detachable manner through the viscoelastic member, and is characterized in that the connecting member is provided at the position which is away from the central rotation axis in the radial direction.

Owing to this rotation stabilizing device, fluctuation of rotating speed of the rotary member is controlled by vibration of the inertia member, and the viscoelastic member having viscosity and elasticity is deformed in accordance with vibration of the inertia member. Therefore, even in the case of generation of vibratory force that causes fluctuation of rotating speed on the rotary member, this fluctuation of rotating speed is controlled, and the rotary member can rotate stably. In addition, since the connecting member connects the rotary member and the inertia member in a detachable manner, it is easy to replace the viscoelastic member, the rotary member and the inertia member, combination of each member is more flexible, adjustment for stabilizing rotation is easier, thus, it is possible to realize a rotation stabilizing device having versatility in use and high degree of freedom. It is also possible to realize a rotation stabilizing device having construction which is of low cost and is strongly-built because of simple structure.

When there is provided a rotary shaft which is fixed on the rotary member and rotates solidly with the rotary member, this rotary shaft can be connected with a rotary shaft of a motor, and thereby, the rotation stabilizing device can be attached on the motor.

When the connecting member is equipped with an attaching member which attaches the viscoelastic member on the rotary member and on the inertia member, it is easy to attach the viscoelastic member.

When the attaching member is provided with a flange section which is formed solidly with the viscoelastic member, it is possible to attach the viscoelastic member on the rotary member and the inertia member. In this case, it is preferable to arrange so that the flange section of the attaching member may be interposed between the rotary member and the inertia member.

The attaching member can be arranged to be supported by a supporting member which is provided on at least one of the rotary member and the inertia member. In this case, it is preferable that the attaching member is fixed on the supporting member with screws or is fitted in the supporting member. It is also preferable that the attaching member is inserted into a through hole formed on the viscoelastic member to be supported with the supporting member.

Further, it is preferable that the rotary member is structured to be in a disc form, and the inertia member is structured to be in a disc form, and in this case, it is preferable that a diameter of the inertia member is greater than that of the rotary member. Incidentally, the disc form mentioned in the present specification means a form on the section obtained by cutting in the direction perpendicular to the central rotation axis, and it also includes those in a flat plate shape and a cylindrical shape.

It is preferable that a plurality of the connecting members are arranged, and in this case, it is preferable that the connecting members are arranged on a concentric circle of the central rotation axis to be provided on locations divided at regular intervals in the circumferential direction on the concentric circle.

A rotation driving mechanism of the invention has therein a rotary member which rotates around a central rotation axis, an inertia member which is arranged at the position that is different from that of the rotary member in the axial direction of the central rotation axis, and a connecting member which has a viscoelastic member having viscosity and elasticity and connects the rotary member with the inertia member in a detachable manner through the viscoelastic member, and is characterized in that a rotation stabilizing device wherein the connecting member is provided to be away from the central rotation axis in the radial direction, a rotation driving means, a rotary shaft which is rotated together with the rotary member by the rotation driving means and a rotation transmission mechanism connected with the rotary shaft are provided.

In this rotation driving mechanism, fluctuation of rotating speed of the rotary member is controlled by vibration of the inertia member and the viscoelastic member having viscosity and elasticity is deformed in accordance with vibration of the inertia member. Therefore, even when vibratory force that causes fluctuation of rotating speed is caused on the rotation driving means, this fluctuation of rotating speed is controlled, and the rotary member of the rotation stabilizing device can rotate stably. As a result, a rotary shaft can rotate stably, and thereby, stable rotation is transmitted from the rotary shaft. Since the connecting member of the rotation stabilizing device connects the rotary member with the inertia member on a detachable manner, it is easy to replace the viscoelastic member, the rotary member and the inertia member, each member can be combined freely, and appropriate adjustment for less vibration can be made easily in the rotation driving mechanism.

In this case, it is preferable that the rotation stabilizing device is further provided with a rotary shaft on the part of the rotation stabilizing device which is fixed on the rotary member to rotate solidly with the rotary member and is connected with the rotary shaft.

It is also possible that the rotation driving means is provided with a rotary drum, and the rotary member of the rotation stabilizing device is structured to be solid with the rotary drum. In this case, the inertia member is connected with the rotary drum through a viscoelastic member.

The rotation transmission mechanism can be provided with a toothed pulley connected with the rotary shaft, a toothed belt which engages with the toothed pulley, and with a toothed pulley which engages with the toothed belt provided on a driven portion. Further, the rotation transmission mechanism may also be provided with a first gear connected to the rotary shaft and with a second gear which is provided on the driven portion and engages with the first gear. Incidentally, in this case, it is also possible to arrange so that the pulley and the gear are made to be solid with the rotary member of the rotation stabilizing device.

It is further possible to make a stepping motor to serve as the rotation driving means.

An image forming apparatus of the invention is characterized to be provided with a rotation driving mechanism which has therein a rotary member which rotates around a central rotation axis, an inertia member which is arranged at the position that is different from that of the rotary member in the axial direction of the central rotation axis, and a connecting member which has a viscoelastic member having viscosity and elasticity and connects the rotary member with the inertia member in a detachable manner through the viscoelastic member, and is provided with a rotation stabilizing device wherein the connecting member is provided to be away from the central rotation axis in the radial direction, a rotation driving means, a rotary shaft which is rotated together with the rotary member by the rotation driving means, and with a rotation transmission mechanism connected with the rotary shaft, a body of rotation which is provided with an image carrier which carries an image formed by an image forming means, and with a fur brush cleaning unit which is driven by the rotation driving mechanism to rotate and cleans the body of rotation.

In the image forming apparatus, even when vibratory force that causes fluctuation of rotating speed is caused on the rotation driving means, this fluctuation of rotating speed is controlled, and the rotary member of the rotation stabilizing device can rotate stably. As a result, a rotary shaft can rotate stably, and thereby, stable rotation is transmitted from the rotary shaft. Therefore, the fur brush cleaning unit rotates stably, and the body of rotation can be cleaned firmly and uniformly.

Another image forming apparatus of the invention is characterized to be provided with a rotation driving mechanism which has therein a rotary member which rotates around a central rotation axis, an inertia member which is arranged at the position that is different from that of the rotary member in the axial direction of the central rotation axis, and a connecting member which has a viscoelastic member having viscosity and elasticity and connects the rotary member with the inertia member in a detachable manner through the viscoelastic member, and is provided with a rotation stabilizing device wherein the connecting member is provided to be away from the central rotation axis in the radial direction, a rotation driving means, a rotary shaft which is rotated together with the rotary member by the rotation driving means, and with a rotation transmission mechanism connected with the rotary shaft, a body of rotation which is provided with an image carrier which carries an image formed by an image forming means, and with a transfer roller or a transfer belt which is driven by the rotation driving mechanism to rotate and transfers an image carried by the image carrier onto a transfer sheet.

In the image forming apparatus, even when vibratory force that causes fluctuation of rotating speed is caused on the rotation driving means, this fluctuation of rotating speed is controlled, and the rotary member of the rotation stabilizing device can rotate stably. As a result, a rotary shaft can rotate stably, and thereby, stable rotation is transmitted from the rotary shaft. Therefore, the transfer roller rotates at the constant speed stably, or the transfer belt moves at the constant speed stably, thus, accuracy for the transfer of an image onto a transfer sheet is improved and images with high quality can be formed.

Further, an image forming apparatus of the invention is characterized to be provided with a rotation driving mechanism which has therein a rotary member which rotates around a central rotation axis, an inertia member which is arranged at the position that is different from that of the rotary member in the axial direction of the central rotation axis, and a connecting member which has a viscoelastic member having viscosity and elasticity and connects the rotary member with the inertia member in a detachable manner through the viscoelastic member, and is provided with a rotation stabilizing device wherein the connecting member is provided to be away from the central rotation axis in the radial direction, a rotation driving means, a rotary shaft which is. rotated together with the rotary member by the rotation driving means, and with a rotation transmission mechanism connected with the rotary shaft, and with an image reading means which reads images while being moved relatively to a document by a pulley driven by the rotation driving mechanism.

In the image reading means, even when vibratory force that causes fluctuation of rotating speed is caused on the rotation driving means, this fluctuation of rotating speed is controlled, and the rotary member of the rotation stabilizing device can rotate stably. As a result, a rotary shaft can rotate stably, and thereby, stable rotation is transmitted to the pulley from the rotary shaft. Therefore, a movement of the image reading means in the course of reading is stabilized, and reading accuracy is improved.

Further, when an image forming apparatus or an image reading apparatus is provided with a rotation driving mechanism equipped with the rotation stabilizing device, rotation can be stabilized on the rotating portions other than the foregoing.

Another image forming apparatus of the invention has therein a body of rotation equipped with an image carrier which carries an image formed by an image forming means and a body of vibration attached on the body of rotation through a body of attenuation having viscosity and elasticity, and it is characterized in that fluctuation of rotating speed of the body of rotation is deterred by vibration of the body of vibration, and the body of attenuation deforms in accordance with vibration of the body of vibration.

In an image forming apparatus of the invention, a body of rotation equipped with an image carrier which carries an image formed by an image forming means and a body of vibration attached on the body of rotation through a body of attenuation having viscosity and elasticity are provided, and fluctuation of rotating speed of the body of rotation is controlled by vibration of the body of vibration, and the body of attenuation deforms in accordance with vibration of the body of vibration. Therefore, even when the vibratory force causing fluctuation of rotating speed on the body of rotation is generated, this fluctuation of rotating speed is controlled by vibration of the body of vibration, and deformation of the body of attenuation having viscosity and elasticity caused by vibration of the body of vibration can transform the fluctuation of speed into heat for convergence of the speed fluctuation, which makes it possible to form an image with high image quality.

Further, if the body of rotation is composed of the image carrier and the first disc portion connected to the image carrier through a shaft, and if the body of vibration is composed of the second disc portion which is provided on the first disc portion through the body of attenuation, the fluctuation of rotating speed of the body of rotation can be reduced by the displacement of the second disc portion from the first disc portion, and deformation in terms of expansion and contraction of the body of attenuation having viscosity and elasticity can deter the displacement of the second disc portion.

In addition, if torsional natural frequency F1 obtained from a spring constant of the body of attenuation and from the moment of inertia of the second disc portion, and torsional natural frequency F2 obtained from a compound spring constant of the shaft connecting the driving system for driving the body of rotation with the first disc portion and from the moment of inertia of the body of rotation, are made to satisfy the following expressions, $$0.5 \times F2 \leq F1 \leq 2 \times F2$$

an attenuation effect by the so-called dynamic damper is exhibited, and thereby, the rotational fluctuation of the body of rotation can be deterred more effectively.

In this case, if the moment of inertia of the second disc portion is set to the value which is 20% or more of the moment of inertia of the body of rotation (more preferable is a value of 30%–120%), it is possible to raise further the effect of attenuation by the dynamic damper.

If the attenuation characteristic of the body of attenuation is made to be the characteristic expressed by the following expression, $$\text{Loss factor tan } \delta \geq 0.05.$$

The attenuation effect can further be enhanced.

If natural frequency $f=(1/2\pi) \cdot \sqrt{(K1/I2)}$ expressed by spring constant K1 of the body of attenuation and by moment of inertia I2 of the body of vibration is set to be smaller than the rotational frequency of the motor that drives the body of rotation and the engagement frequency of the gear that drives the body of rotation, it is possible to prevent resonance of the body of vibration, and thereby to deter the fluctuation of the body of rotation.

On the other hand, even when natural frequency $f=(1/2\pi) \cdot \sqrt{(K1/I2)}$ expressed by spring constant K1 of the body of attenuation and by moment of inertia I2 of the body of vibration is set between the rotational frequency of the motor that drives the body of rotation and the engagement frequency of the gear that drives the body of rotation, it is possible to prevent resonance of the body of vibration, and thereby to deter the fluctuation of rotation speed of the body of rotation.

BRIEF DESCRIPTION OF THE DRAWINGS

FIG. 5(a) is a perspective view of a rotation stabilizing device in the present embodiment, FIG. 5(b) is a perspective view of a rotary member, FIG. 5(c) is a perspective view of an inertia member, FIG. 5(d) is a perspective view of a connecting member, FIG. 5(e) is a sectional view of a rotation stabilizing device, FIG. 5(f) is a sectional view of a rotary member, FIG. 5(g) is a sectional view of an inertia member, and FIG. 5(h) is a sectional view of a connecting member.

FIG. 6(a) is a perspective view of a rotation stabilizing device, FIG. 6(b) is a perspective view of a rotary member, FIG. 6(c) is a perspective view of an inertia member, FIG. 6(d) is a perspective view of an attaching member, FIG. 6(e) is a sectional view of a viscoelastic member, FIG. 6(f) is a sectional view of a rotation stabilizing device, FIG. 6(g) is a sectional view of a rotary member, and FIG. 6(h) is a sectional view of an inertia member, FIG. 6(i) is a sectional view of an attaching member and FIG. 6(j) is a sectional view of a viscoelastic member, all in another embodiment.

FIG. 9(a) is a side view showing a rotation driving mechanism having a toothed pulley and a timing belt in the present embodiment, and FIG. 9(b) is a side view showing another example.

Figure 13:
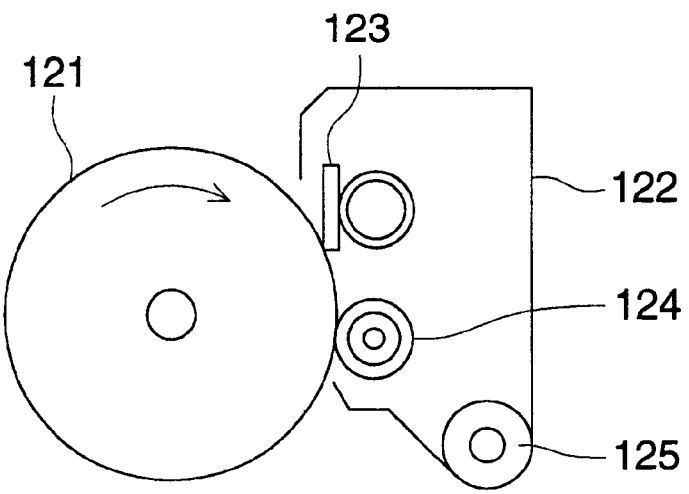
Figure 13:
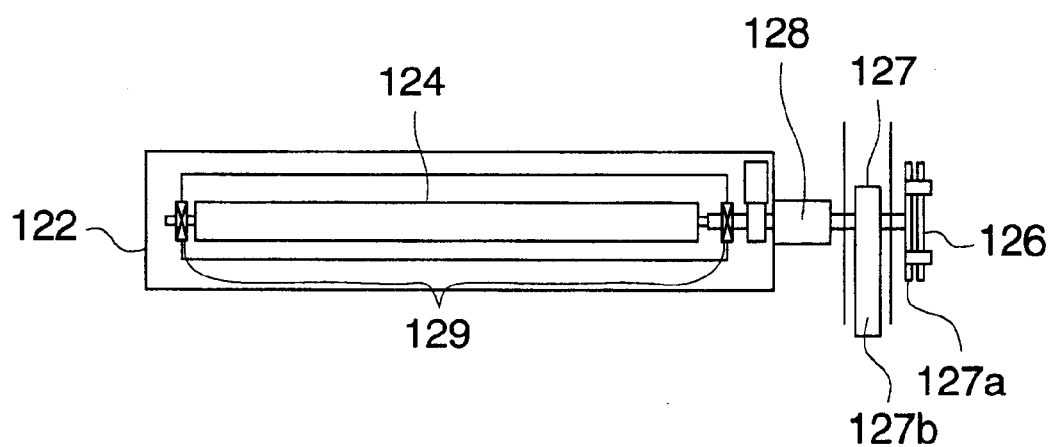

Each of FIGS. 13(a) and 13(b) is a diagram showing an example wherein a rotation stabilizing device is provided in a fur brush cleaning unit having a rotation driving mechanism.

Figure 14:
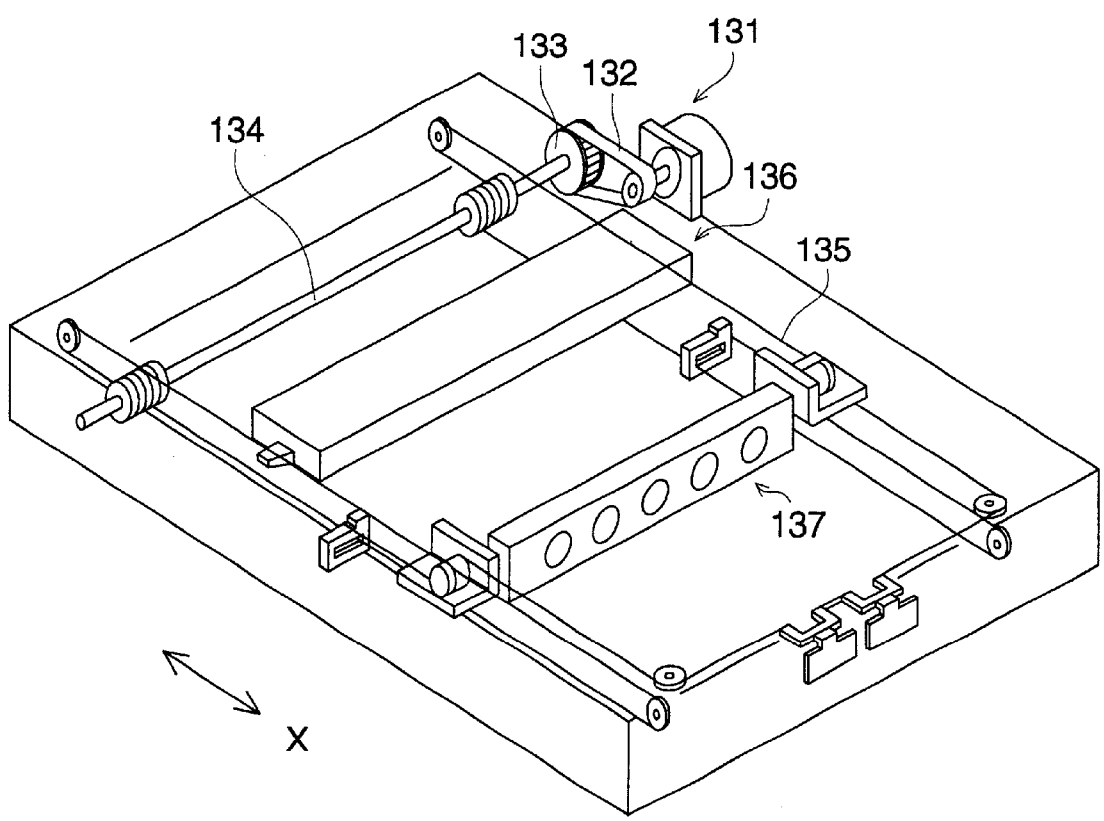

FIG. 14 is a diagram showing an example wherein a rotation driving mechanism employing a stepping motor is provided in FIG. 9(a) or FIG. 9(b).

Each of FIG. 15(a) and FIG. 15(b) is a diagram showing how to obtain the natural frequency from frequency response data.

DETAILED DESCRIPTION OF THE PREFERRED EMBODIMENT

Figure 1:
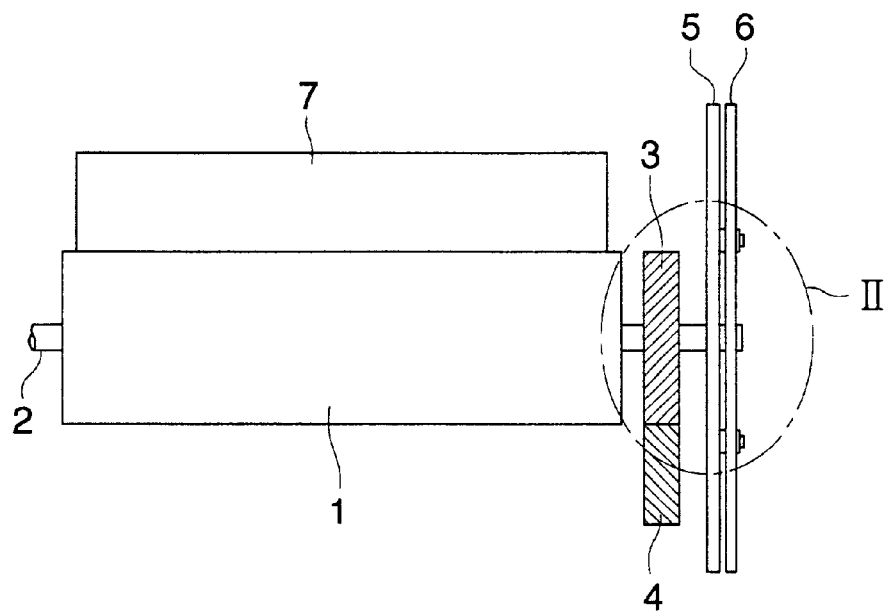
FIG. 1 is a diagram showing a part of a copying machine representing an image forming apparatus related to the present embodiment.

An embodiment of the invention will be explained as follows, referring to the drawings. FIG. 1 is a diagram showing a part of a copying machine representing an image forming apparatus related to the present embodiment.

In FIG. 1, photoreceptor drum 1 representing an image carrier is mounted on drum shaft 2 so that it may rotate solidly with the drum shaft, and the drum shaft 2 is supported rotatably by an unillustrated bearing. On the right side portion of the photoreceptor drum 1, there is attached gear 3 so that the gear may rotated solidly with drum shaft 2. The gear 3 is engaged with gear 4, and it receives rotational torque from an unillustrated motor through the gear 4.

On the right side of the gear 3, there is attached flywheel (rotary member) 5 representing a disc having a large diameter on drum shaft 2 so that the fly wheel may rotate solidly with the drum shaft. Further, on the right side of the fly wheel 5, inertia section (inertia member) 6 representing a disc having the same diameter as that of the fly wheel 5 is attached on the fly wheel 5 through grommet 8 which will be described later, without being provided directly on the drum shaft 2. Incidentally, an outer circumferential surface of rotation drum 1 is in contact with a lower end edge of rectangular scraping blade 7.

Figure 2:
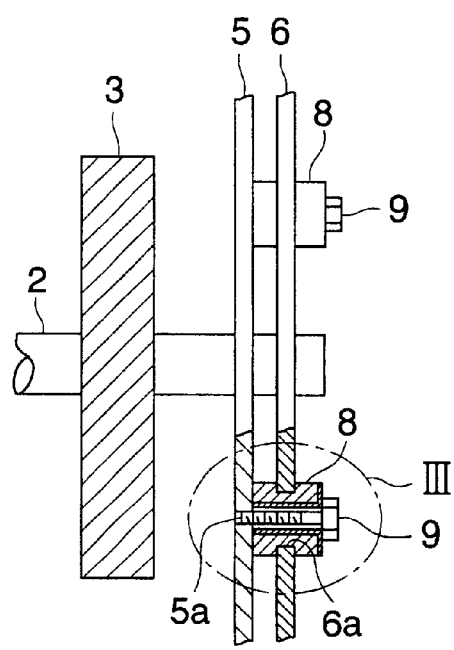
FIG. 2 is a partial section showing the enlarged II portion of the structure in FIG. 1.
Figure 3:
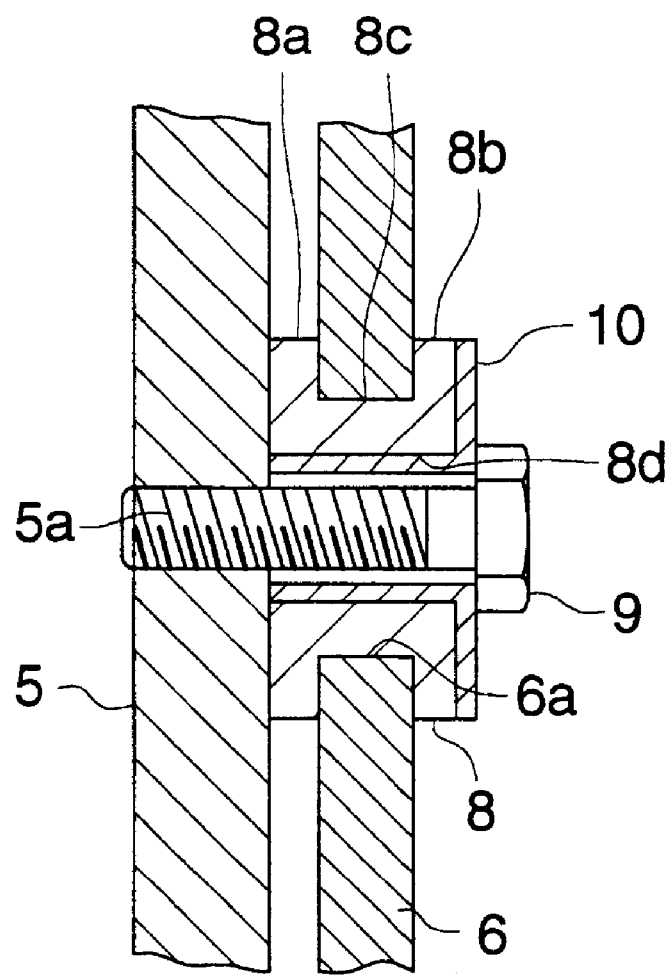
FIG. 3 is a diagram showing the enlarged III portion of the structure in FIG. 2.

FIG. 2 is a partial section showing the enlarged II portion of the structure in FIG. 1. FIG. 3 is a diagram showing the enlarged III portion of the structure in FIG. 2. As shown in FIG. 2 and FIG. 3, the flywheel 5 is connected with the inertia section 6 through grommet 8 and bolt 9. This connecting mode will be explained in detail. Screw holes 5a are formed at regular intervals of 90 degrees on the flywheel 5, while, through hole 6a is formed on the portion corresponding to screw hole 5a on the inertia section 6. Further, grommet 8 is mounted in a way that it passes through the through hole 6a.

Grommet 8 is formed solidly with materials having viscosity and elasticity, and it has a form wherein two disc portions 8a and 8b which are in parallel with each other are connected by cylinder section 8c having a diameter smaller than those of the disc portions. Incidentally, as shown in FIG. 3, an outside diameter of each of the disc portions 8a and 8b is larger than an inside diameter of through hole 6a on inertia section 6, but that outside diameter can be made small enough so that it can pass through the through hole 6a of inertia section 6 because of elasticity of the grommet 8, if an outer circumferential surface of either one of the disc portions 8a and 8b is squeezed down. Since the disc portion 8a (or 8b) is restored to its original diameter after passing through the through hole 6a, the grommet 8 does not fall accidentally after being attached.

When sleeve 10 having a flange is inserted in through hole 8a of grommet 8 after the grommet 8 is made to pass through the through hole 6a of the inertia section 6, and when screw 9 is inserted in the sleeve 10 to be engaged with screw hole 5a of flywheel 5, the flywheel 5 is connected to the inertia section 6 through the grommet 8. Incidentally, in the present embodiment, the grommet is a name representing a member having a form shown in FIG. 3 and having viscosity and elasticity. It is therefore naturally possible to use another member having the same form and functions, independently of the name.

Incidentally, elasticity is a property wherein, when the load is removed to eliminate the stress, the strain is also eliminated to return to the original shape, while, viscosity is a property wherein, when a fluid layer is moved relatively to the other layer, internal friction is caused along a boundary surface between the both layers as a result of adhesion and cohesion to resist a flow of the fluid.

In this case, it is preferable that torsional natural frequency F1 obtained from a spring constant of grommet 8 and from the moment of inertia of flywheel and torsional natural frequency F2 obtained from a compound spring constant of shaft 2 connecting gears 3 and 4 which drive photoreceptor drum 1 and inertia section 6 to the inertia section 6 and from the moment of inertia of the photoreceptor drum 1 and of the inertia section 6, satisfy the following expression.

$$0.5 \times F2 \leq F1 \leq 2 \times F2.$$

As stated above, by making the natural frequency of the first vibration system composed of grommet 8 and flywheel 5 to be close to natural frequency F2 of the second vibration system of shaft 2 connecting gears 3 and 4 which drive photoreceptor drum 1 and inertia section 6 to the inertia section 6, the so-called dynamic damper effect can be expected, and if this effect is exhibited, vibration of the first vibration system can control the vibration (speed unevenness) of the second vibration system. On the other hand, vibration of the first vibration system can be attenuated effectively, because the vibration of the first vibration system is transformed into heat by deformation of grommet 8.

Figure 4:
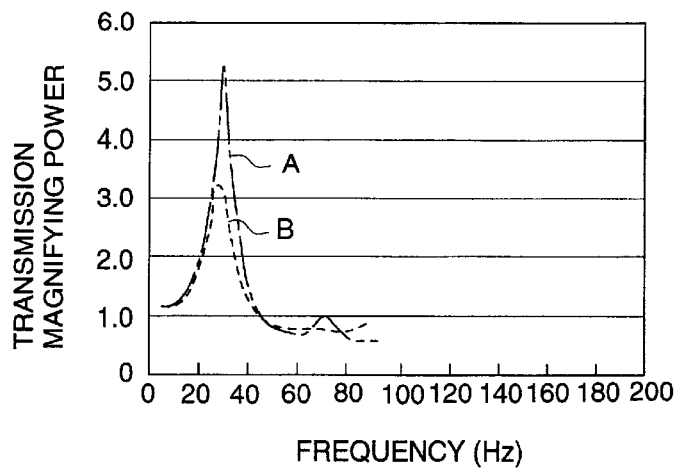
FIG. 4(a) is a diagram showing the transmission function of the driving system obtained from experiments in the structure in FIG. 1, wherein the axis of ordinates represents a transmission magnifying power and the axis of abscissas represents a frequency. Each of FIGS. 4(b) and 4(c) is a diagram showing changes in speed unevenness of a photoreceptor drum obtained equally from experiments, wherein the axis of ordinates represents speed unevenness and the axis of abscissas represents a frequency.
Figure 4:
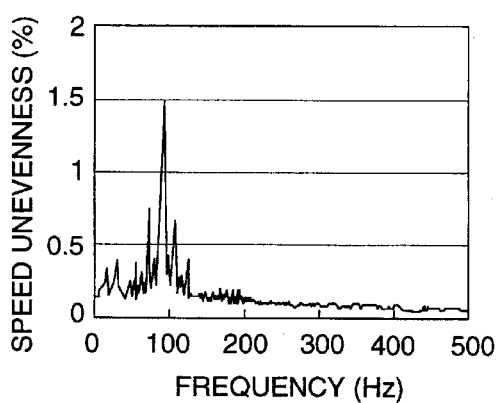
Figure 4:
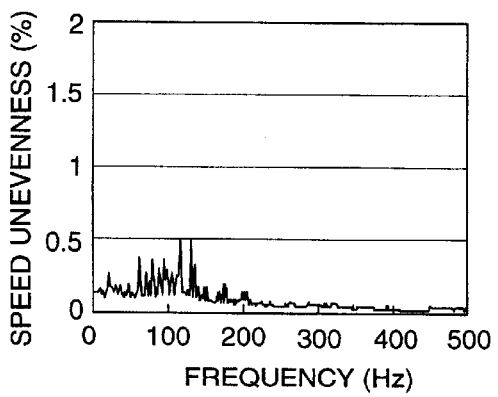

FIG. 4(a) is a diagram wherein the axis of ordinates represents the transmission magnifying power and the axis of abscissas represents a frequency, and the transmission functions of the driving systems (gears 3 and 4) obtained by experiments in the structure shown in FIG. 1 are shown. Each of FIGS. 4(b) and 4(c) is a diagram wherein the axis of ordinates represents speed unevenness and the axis of abscissas represents a frequency, and changes in speed unevenness of photoreceptor drum 1 obtained equally from experiments are shown. In this case, the transmission magnifying power can be expressed by a ratio of a displacement of member B to that of member A in the occasion where member B supporting member A through vibration-proof materials is vibrated, and it is a value showing characteristics of vibration-proof of the vibration-proof materials.

The transmission function shown in each of FIGS. 4(a)–4(c) is obtained from a ratio of the speed fluctuation of the motor to that of photoreceptor drum 4 in each frequency under the condition that a fluctuation component causing speed fluctuation is included in the motor control signal, and its frequency is changed. The speed fluctuation of the motor was obtained from output of an encoder on the motor shaft, and speed fluctuation of the photoreceptor drum was obtained by irradiating photoreceptor drum 4 with a laser beam and by analyzing its scattered light with FFT. Incidentally, the moment of inertia of the flywheel 5 was 50% of that of the photoreceptor drum 1 and inertia section 6. Details of the measuring instrument are omitted here.

In a copying machine in the present embodiment, photoreceptor drum 1 stores thereon electric charges coming from an unillustrated charging device (image forming apparatus) while it makes one turn, and adsorbs toner on its outer circumferential surface, then, the toner is transferred onto paper, and toner remaining on the photoreceptor drum is removed by scraping blade 7 or a fur brush in succession so that the remaining toner may be eliminated from the photoreceptor drum before the succeeding electric charges are accumulated.

When the photoreceptor drum 1 rotates by receiving power from an unillustrated motor through gears 3 and 4, it is vibrated by resistance of scraping blade 7 or a fur brush, and resonance of torsional vibration is caused on drum shaft 2. In this case, when neither inertia section 6 nor grommet 8 is provided, the transmission magnifying power of the driving system grows greater as shown with two-dot chain lines in FIG. 4(a), and speed unevenness close to 1.5% is generated in the vicinity of frequency 30–100 Hz (natural frequency of the torsional vibration system composed of photoreceptor drum 1, shaft 2, gear 3 and flywheel 5) as shown in FIG. 4(b), which was found.

On the contrary, in the case of the present embodiment, the transmission magnifying power of the driving system is lowered by about 50% as shown with dotted lines in FIG. 4(a) by inertia section 6, and grommet 8 both provided. As a result of a fall of the vibration gain, the rate of amplification at (30–80 Hz) in the vicinity of the natural frequency of the torsional vibration system is lowered, and thereby, speed unevenness can be controlled to 5% or less as shown in FIG. 4(c), which was found.

In consideration of the results of experiments mentioned above, there are considered the following reasons for the sharp reduction of transmission magnifying power of the driving system at frequency 30 Hz–80 Hz in the present embodiment. Namely, it is considered that the so-called dynamic damper effect is generated, and a system composed of the inertia section 6 and grommet 8 resonates to make great angular displacement in both directions for the flywheel 5 at frequency 30 Hz–80 Hz, thereby resonance of drum shaft 2 is deterred as a reciprocal action, because torsional natural frequency F1 obtained from a spring constant of grommet 8 and from the moment of inertia of flywheel and torsional natural frequency F2 obtained from a compound spring constant of shaft 2 connecting gears 3 and 4 which drive photoreceptor drum 1 and inertia section 6 to the inertia section 6 and from the moment of inertia of the photoreceptor drum 1 and of the inertia section 6 are made to satisfy the expression stated above.

On the other hand, an angular displacement of the inertia section 6 from the flywheel 5 is transformed into heat by deformation (expansion and contraction and a twist) of grommet 8 having viscosity to be attenuated. Incidentally, with regard to a material of grommet 8, it has been cleared that speed fluctuation can be reduced satisfactorily when the attenuation characteristic of the material satisfies the expression of loss factor tan $\delta \geq 0.05$. In this case, the loss factor tan 6 is a value indicating a vibration absorption power of the material such as rubber, and it is shown that the greater the value is, the better the vibration absorption efficiency is. In the present embodiment, as a result of measurement at measurement frequency of 10 Hz in the atmospheric temperature of 0–60° C., the dynamic distortion is expressed by the maximum value for tension. Incidentally, with regard to loss factor tan $\delta$, details thereof are not described below because it depends on JISK6394, frequency for measurement is 3–100 Hz, and dynamic distortion can be the maximum value of the measurement for any one of shear, compression and tension.

It has been cleared that if the moment of inertia of the inertia section 6 is set to the value of 20% or more (preferably, 30%–120%, more preferably, 30%–100%) of the moment of inertia of photoreceptor drum 1 and flywheel 5, the speed fluctuation can further be reduced satisfactorily.

Incidentally, in FIG. 4(a), the rotational frequency of the driving motor which drives drum shaft 2 is considered to be about 30 Hz and engagement frequency of gear 3 is considered to be about 100 Hz. Therefore, it is preferable that "natural frequency expressed by spring constant K1 of grommet 8 and by moment of inertia I2 of inertia section 6" $f=(1/2\pi)\cdot\sqrt{(K1/I2)}$ is made to be lower than 30 Hz, or to be lower than 100 Hz when it is higher than 30 Hz.

If the natural frequency f is set in the aforesaid way, there is no fear that resonance is caused on inertia section 6 based on at least rotational frequency of the driving motor or engagement frequency of gear 3, and thereby the fluctuation of rotation speed of photoreceptor drum 1 can be deterred more effectively.

Further, with regard to grommet 8 whose example is shown in FIG. 3, those having various diameters and lengths are on the market and they can be obtained relatively easily. Therefore, it is possible to deter speed fluctuation properly at low cost, in accordance with specifications of rotation drum 2 in a copying machine.

Now, inertia I of a flywheel and of a photoreceptor drum (diameter: d1 cm, bore: d2 cm and weight: w (kgf)) and torsion spring constant K2 can be obtained from the following expressions;

$$I=w(d1^2+d2^2)/8(kgf\cdot cm^2) \quad (1)$$

$$K2=I(2\pi F2)^2/980(kgf\ cm/rad) \quad (2)$$

wherein, F2 represents a frequency at the peak of the transfer function shown in FIG. 4(a), and it is a natural frequency.

To be concrete in explanation, conditions A in FIG. 4(a)(the same conditions as in FIG. 4(b)) represent photoreceptor drum inertia Ib=19.5 (kgf cm$^2$) and total flywheel inertia Ifw=58.5×3 sheets=175.5 (kgf cm$^2$) both totaling I=Ib+Ifw=195 (kgf cm$^2$). FIG. 4(a) shows that natural frequency F2 is 22 Hz. Therefore, driving system torsion spring constant K2=195×(2π×22)$^2$/980=3798 (kgf/rad).

Conditions B in FIG. 4(a)(the same conditions as in FIG. 4(c)) represent photoreceptor drum plus flywheel inertia I1=58.5×2+19.5=136.5 (kgf cm$^2$) and inertia section inertia I2=58.5 (kgf cm$^2$) (d1=22 cm, d2=5 cm, w=0.9 kg) both totaling I=I1+I2=195 (kgf cm$^2$).

Three-grommet composite spring constant K1 and natural frequency F1 can be obtained in the following manner. Incidentally, material for the grommet is (HDR-C) made by NOK Co. and its rubber hardness is 40 degrees and its tan δ is 0.8.

As shown in FIG. 15(a), natural frequency F1 is obtained from the peak frequency of frequency response data which are obtained in a way wherein flywheel section 151 on which inertia section 152 is fitted by grommet 153 is fixed on rest 154, and the inertia section 152 is excited in its rotation direction by excitation hammer 158 as shown in FIG. 15(b), then, its respondence is measured by acceleration sensor 157 and is analyzed by FFT analyzer 156. As a result, the natural frequency F1 is 23.5 Hz. Further, composite spring constant K1 is obtained in the following expression.

$$K1=I2\times(2\pi\times F1)^2/980=58.5\times(2\pi\times23.5)^2/980=1300\ (kgf/rad)$$

A rotation stabilizing device in an embodiment of the invention will be explained as follows, referring to the drawings. Each of FIGS. 5(a)–5(h) is a diagram showing an example of a rotation stabilizing device related to the present embodiment.

As shown in FIGS. 5(a)–5(h), rotation stabilizing device 11 is equipped with rotary member 12 formed to be a flat disc having thereon rotary shaft holding section 12b for the rotation center and plural holes 12a arranged at regular intervals in the circumferential direction on the concentric circle of the rotary shaft holding section 12b, inertia member 13 formed to be a flat disc having thereon central hole 13b which is larger in terms of a diameter than the rotary shaft holding section 12b of the rotary member 12 and plural holes 13a provided to correspond to the holes 12a of the rotary member 12, and with plural connecting members 14 each being made solidly of a material having elasticity and viscosity to be in a shape of a cylinder on the whole, and having plural flange portions 14a, 14b, 14c, small diameter section 14d positioned between the flange portion 14a and the flange portion 14b, and small diameter section 14e positioned between the flange portion 14b and the flange portion 14c.

As shown in FIGS. 5(a) and 5(e), in the rotation stabilizing device 11, plural connecting members 14 have elastic property, and when each of the flange portions 14a–14c is squeezed in each hole 12a of the rotary member 12 and in each hole 13a of the inertia member 13 through elastic deformation, and then is restored to the original state, the inertia member 13 is positioned to be interposed between the flange portion 14a and the flange portion 14b, and the small diameter section 14d is positioned to face an inner circumferential surface of each hole 13a of the inertia member 13, while, the rotary member 12 is positioned to be interposed between the flange portion 14b and the flange portion 14c, and the small diameter section 14e is positioned to face an inner circumferential surface of each hole 12a of the rotary member 12.

As stated above, the connecting member 14 serves both as a viscoelastic member and an attaching member, and it is attached on both the rotary member 12 and the inertia member 13 through utilization of elastic deformation and restoration of elasticity of the flange portions 14a–14c, so that both the rotary member and the inertia member are connected through the viscoelastic member. Further, the connecting member 14 can be removed easily, owing to its elastic deformation, from the hole 12a of the rotary member 12 and from the hole 13a of the inertia member 13.

In this case, the flange portions 14a and 14b of the connecting member 14 are in relatively close contact with the inertia member 13 and the flange portions 14b and 14c are in relatively close contact with the rotary member 12, while, the small diameter sections 14d and 14e of the connecting member 14 are positioned to be relatively loose to face respectively inner circumferential surfaces of the hole 12a and 13a. Due to this, each connecting member 14 can be rotated in each of the holes 12a and 13a.

Dimensions for a diameter and a length of the viscoelastic member which constitutes the connecting member 14 can be determined so that a specific frequency may be reduced, and a form of the viscoelastic member can be those other than a cylindrical form, and it can be a cube. For example, a grommet can be used.

As a material having this elasticity and viscosity, a material which has appropriate attenuation characteristics for the frequency of vibration to be reduced and has tan δ of 0.05 or more, is preferable. The material of this kind includes natural rubber and synthetic rubber, and for example, it is possible to use NBR (acrylonitrile butadiene rubber), IIR (butyl rubber) and silicone rubber, EPDM (ethylene propylene non-conjugated diethane) to which the invention is not limited. Further, as a rubber hardness, those in a range of 20–70 degrees are preferable.

As a material of the rotary member, metals such as iron, aluminum and brass, and resins such as POM and ABS can be used, and sheet metal, sintered products, machined parts and resin molded parts which are manufactured from the materials stated above can be used. However, the invention is not limited to the aforesaid materials and manufacturing methods.

Though the same material can be used for the inertia member 13 and the rotary member 12, it is preferable that at least one of the inertia member 13 and the rotary member 12 is made of metal, and it is more preferable that both of them are made of metal.

The rotation stabilizing device 11 stated above is connected when rotary shaft 20 such as a motor is fitted in rotary shaft holding section 12b of the rotary member 12 therein as shown in FIG. 5(e). The rotation of the rotary shaft 20 of the motor or the like makes the rotary member 12 of the rotation stabilizing device 11 to rotate together with the inertia member 13, in which, even when vibratory force that causes fluctuation of rotating speed on the rotary member 12 is generated by the motor or the like, this fluctuation of rotating speed is controlled, and the rotary member 12 can rotate stably, because the fluctuation of the rotating speed of the rotary member 12 is controlled by vibration of the inertia member 13 in its rotation and the connecting member 14 (viscoelastic member) is deformed in accordance with vibration of the inertia member 13. As a result, the rotary shaft 20 is rotated stably while vibration of the rotary shaft 20 is controlled.

Since the connecting member 14 connects the rotary member 12 with the inertia member 13 on a detachable manner, it is easy to replace the connecting member 14 representing a viscoelastic member, the rotary member 12 and the inertia member 13, and combination of members 12, 13 and 14 is free, which makes adjustment for stable rotation to be easy, and thereby, makes it possible to realize a rotation stabilizing device which is versatile to be used and has high degree of freedom. Since it is easy to recombine the viscoelastic member, the rotary member and the inertia member in a rotation stabilizing device, as stated above, it is possible to attain, at low cost, the cost reduction for a trial model, a degree of freedom for design and appropriate vibration reduction design, which is preferable. Further, the structure of the rotation stabilizing device is simple as stated above, and it can be structured to be durable to have high durability, thus, stabilized capacity can be obtained for a long time.

Another rotation stabilizing device 21 will be explained as follows, referring to FIGS. 6(a)–6(j). Since this rotation stabilizing device 21 is of the same structure as in FIGS. 5(a)–5(h), except that a connecting member is composed of a viscoelastic member and an attaching member, the same parts are given the same symbols and explanation therefor will be omitted.

As shown in FIGS. 6(d), 6(e), 6(i) and 6(j), a connecting member which connects rotary member 12 with inertia member 13 is formed solidly on the whole with materials having elasticity and viscosity, and it is composed of viscoelastic member (grommet) 24 that is equipped with flange portions 24a and 24a on both ends of the connecting member, small diameter section 24b formed between the flange portions 24a and with through hole 24c formed at the center, and of attaching member 25 that is equipped with screw portion 25b that is inserted into through hole 24c of viscoelastic member 24 to be screwed in screw hole 12c of rotary member 12 and with intermediate step portion 25a.

As shown in FIGS. 6(a) and 6(f), in the rotation stabilizing device 21, when viscoelastic member 24 is squeezed, through its elastic deformation, into each hole 13a of inertia member 13, to be restored in terms of elasticity, the inertia member 13 is positioned between the flange portions 24a and 24a so that small diameter section 24b may face an inner circumferential surface of each hole 13a, and then, attaching member 25 is inserted into through hole 24c to be screwed in screw hole 12c of rotary member 12. Due to this, the rotary member 12 is connected with the inertia member 13 through viscoelastic member 24. Since the attaching member 25 has thereon step portion 25a which comes in contact with the surface of the rotary member 12 in this case, the attaching member 25 maintains the viscoelastic member 24 to a constant distance between flange portions 24a so that it may not be subjected to unnecessary compression deformation.

In the rotation stabilizing device 21, when the attaching member 25 is unscrewed to be loosened, the rotary member 12 and the inertia member 13 can easily be removed, as stated above, and the viscoelastic member 24 can easily be taken out of each hole 13a of the inertia member 13 through elastic deformation. As a material for the attaching member 25, those which are higher in terms of rigidity than the viscoelastic member are preferable.

When the rotation stabilizing device 21 stated above is connected to rotary shaft 20 of a motor or the like as shown in FIG. 6(f), the same effect as in FIGS. 5(a)–5(h) can be obtained. Incidentally, small diameter section 24b of the viscoelastic member 24 is positioned to be relatively loose in an inner circumferential surface of hole 13a of the inertia member 13, and thereby, the viscoelastic member 24 can be rotated around hole 13a of the viscoelastic member 24. Though the viscoelastic member is attached on hole 13a of the inertia member 13 in FIGS. 6(a)–6(j), it is also possible to attach the viscoelastic member on the hole of rotary member 12, and thereby, to form a screw hole on the inertia member for attachment.

Next, still another rotation stabilizing device 31 will be explained as follows, referring to FIGS. 7(a) and 7(b). The rotation stabilizing device 31 employs an inertia member, a viscoelastic member and an attaching member which are the same as those in FIGS. 6(a)–6(j), but, the rotary member does not have a rotary shaft in particular. Namely, rotor 32 constituting a DC outer rotor motor is made to be a rotary member, and inertia member 13 is attached on end face 32a of the rotor 32 through viscoelastic member 24 by attaching member 25.

Rotary shaft 33 is rotatable through bearing 36 of cylindrical portion 33a which is solid with motor attaching plate 35, and it is connected with rotor 32 to be rotated solidly with the rotor. When coil 33b on an outer circumferential surface of the cylindrical portion 33a is energized from motor electric base board 35a, even when vibratory force that causes fluctuation of rotating speed of the motor is caused on rotor 32 when the rotor 32 and rotary shaft 33 are rotated by an action of magnet 34 on an inner circumferential surface of the roller 32, the fluctuation of rotating speed is controlled by the rotation stabilizing device 31, and thereby, the rotor 32 and the rotary shaft 33 can rotate stably, and the same effect as in FIGS. 5(a)–5(h) can be obtained. In particular, a DC motor is easily subjected to speed fluctuation in a low speed rotation zone due to cogging. However, the speed fluctuation is absorbed in the present structure, and stable rotating speed can be obtained even in the case of low speed rotation. It is effective, in particular, when frequency of the cogging component is made to agree with natural frequency of the rotation stabilizing device 31.

Incidentally, in the rotation stabilizing device stated above, a flywheel of a fixed type may also be used in common. Further, a rotary member may also be made of a material having viscosity and elasticity. Furthermore, a rotary member made of the viscoelastic material and the viscoelastic member may be combined solidly.

Figure 7:
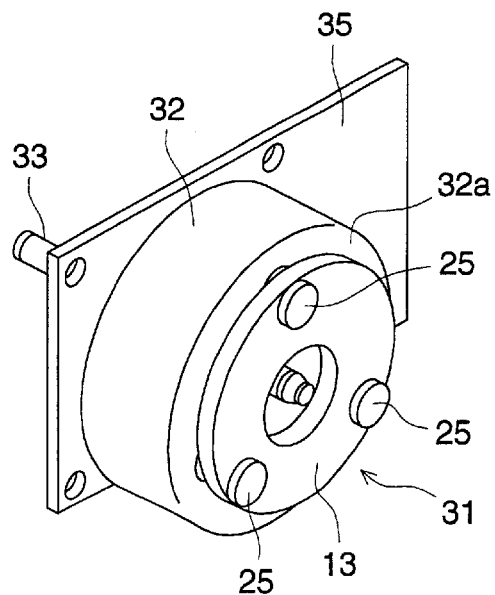
FIG. 7(a) is a perspective view and FIG. 7(b) is a sectional view, both of another rotation stabilizing device of the present embodiment.
Figure 7:
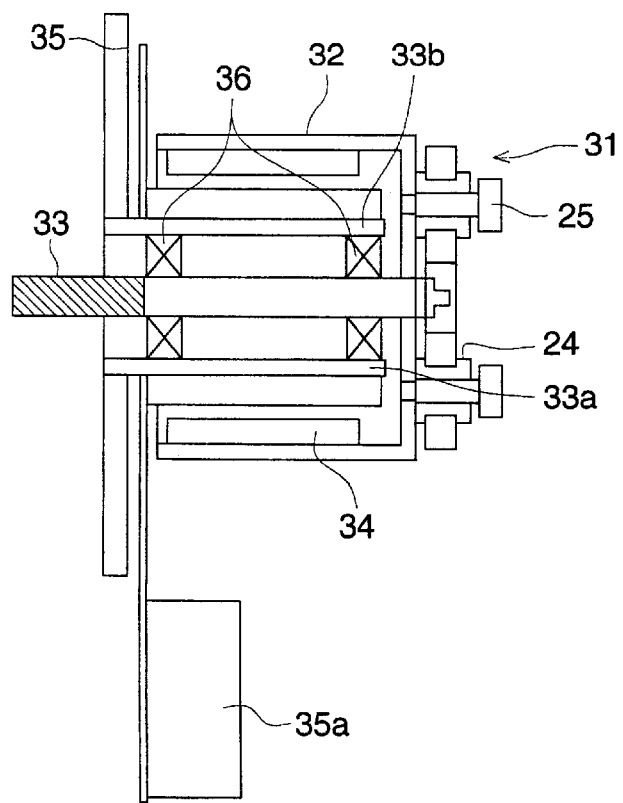
Figure 8:
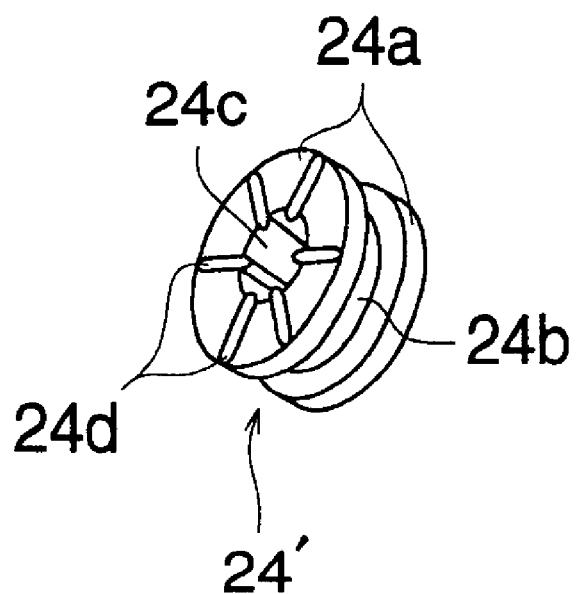
FIG. 8 is a perspective view showing a variation of the viscoelastic member shown in FIG. 6(e).

Next, an example of variation of the viscoelastic member which can be used in FIGS. 6(a)–6(j) and in FIGS. 7(a) and 7(b) will be shown in FIG. 8. This viscoelastic member 24' is one on which plural linear small wales 24d each being continuous from the surface of flange portion 24a to an inner circumferential surface of through hole 24c are provided. Small wale 24d is extended radially in the radial direction on the flange section 24a, and it is extended straight in the longitudinal direction in an inner circumferential surface of the through hole 24c. It is possible to adjust attenuation characteristics of vibration by the height and number of small wales 24c.

Next, referring to FIGS. 9(a) and 9(b), there will be explained a rotation driving mechanism provided with a rotation stabilizing device which is mostly the same as that shown in FIGS. 6(a)–6(j) stated above. A rotation driving mechanism in FIG. 9(a) is provided with rotation stabilizing device 41, motor 42, rotary shaft 43 of the motor, toothed pulley 44 fixed on the part of end portion 43a on rotary shaft 43 of the motor 42, and toothed driving belt 45 which engages with the toothed pulley 44.

A rotation transmission mechanism is constituted with the toothed driving belt 45 which engages with the toothed pulley 44 and another toothed pulley (not shown) provided on the driven portion. A rotation of the rotary shaft 43 of the motor 42 is stabilized by the rotation stabilizing device 41, which results in that a rotation in the driven portion transmitted by the rotation transmission mechanism is stabilized.

Incidentally, the rotation stabilizing device 41 is structured so that viscoelastic member 24 is attached on the part of rotary member 12 to be connected to a screw hole of inertia member 13 by attaching member 25.

Further, by forming the pulley 44 to be solid with rotary member 12 of the rotation stabilizing device 41 in FIG. 9(a), the structure can be made simple and the number of parts can be reduced, which makes it possible to realize low cost.

The rotation driving mechanism in FIG. 9(b) is one wherein the toothed pulley 44 is fixed on the part of end portion 43a on the rotary shaft 43 of motor 42, and rotation stabilizing device 41 is attached on the part of the other end portion 43b on the rotary shaft 43. Due to this, it is possible to obtain the same effect as in FIG. 9(a).

Next, another rotation driving mechanism will be explained as follows, referring to FIGS. 10(a), 10(b) and 10(c).

Figure 10:
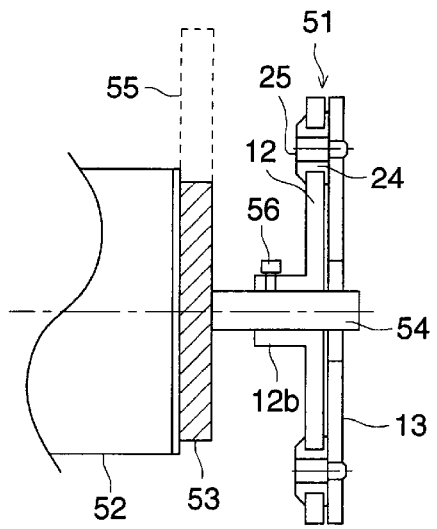
FIG. 10(a) is a side view showing a rotation driving mechanism having a driving gear in the present embodiment, and each of FIGS. 10(b), 10(c) and 10(d) is a side view showing another example.
Figure 10:
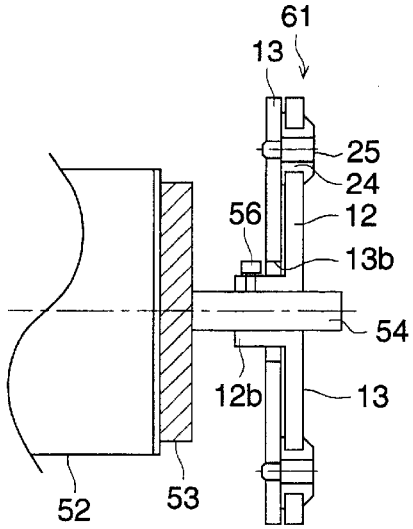
Figure 10:
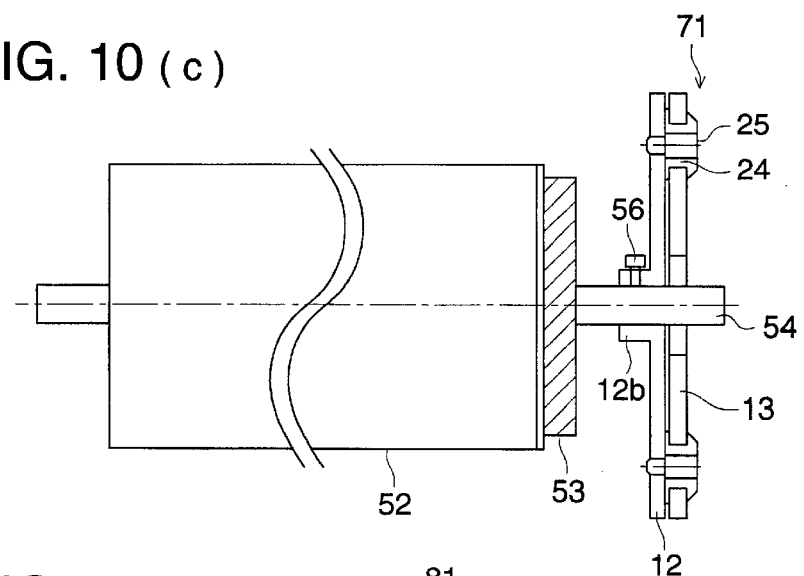
Figure 10:
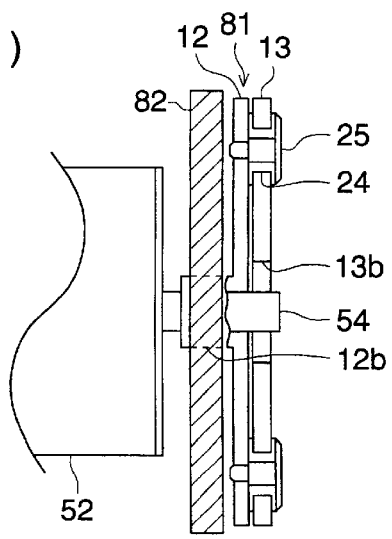

The example shown in FIG. 10(a) shows a construction wherein second gear 55 shown with dashed lines is driven by first gear 53 fixed on rotary shaft 54 of motor 52. Rotation stabilizing device 51 which is mostly the same as one shown in FIGS. 6 (a)–6(j) is fixed on rotary shaft 54 by means of screw 56, with rotary shaft 12b of rotary member 12 of the rotation stabilizing device 51 fitted on the rotary shaft 54. The rotation stabilizing device 51 is provided with rotary member 12 on which viscoelastic member 24 is attached on the part of gear 53, and inertia member 13 located outside is combined with the rotary member by attaching member 25. As a result of rotation of the rotary shaft 54 of motor 52 stabilized by the rotation stabilizing device 51, there is stabilized a rotation of a driven portion transmitted by the gear mechanism which is a rotation transmitting mechanism.

An example shown in FIG. 10(b) represents the structure of rotation stabilizing device 61 wherein inertia member 13 is provided on the part of gear 53 on rotary shaft 54, and rotary shaft 12b of rotary member 12 on which viscoelastic member 24 is attached is made to pass through central hole 13b of the inertia member 13 to be fixed by screw 56 on the part of gear 53 on the rotary shaft 54.

An example shown in FIG. 10(c) represents the structure of rotation stabilizing device 71 wherein rotary member 12 is provided on the part of gear 53 on rotary shaft 54 in the same way as in FIG. 10(a), and viscoelastic member 24 is attached on inertia member 13. Even in the case of FIGS. 10(b) and 10(c), the same effect as in FIG. 10(a) can be obtained.

Further, driving gear 82 may also be united with rotary member 12 of rotation stabilizing device 81 in the same structure as in FIG. 10(c), as shown in an example of FIG. 10(d). Due to this, the structure can be made simple and the number of parts can be reduced, which makes it possible to realize low cost.

Figure 11:
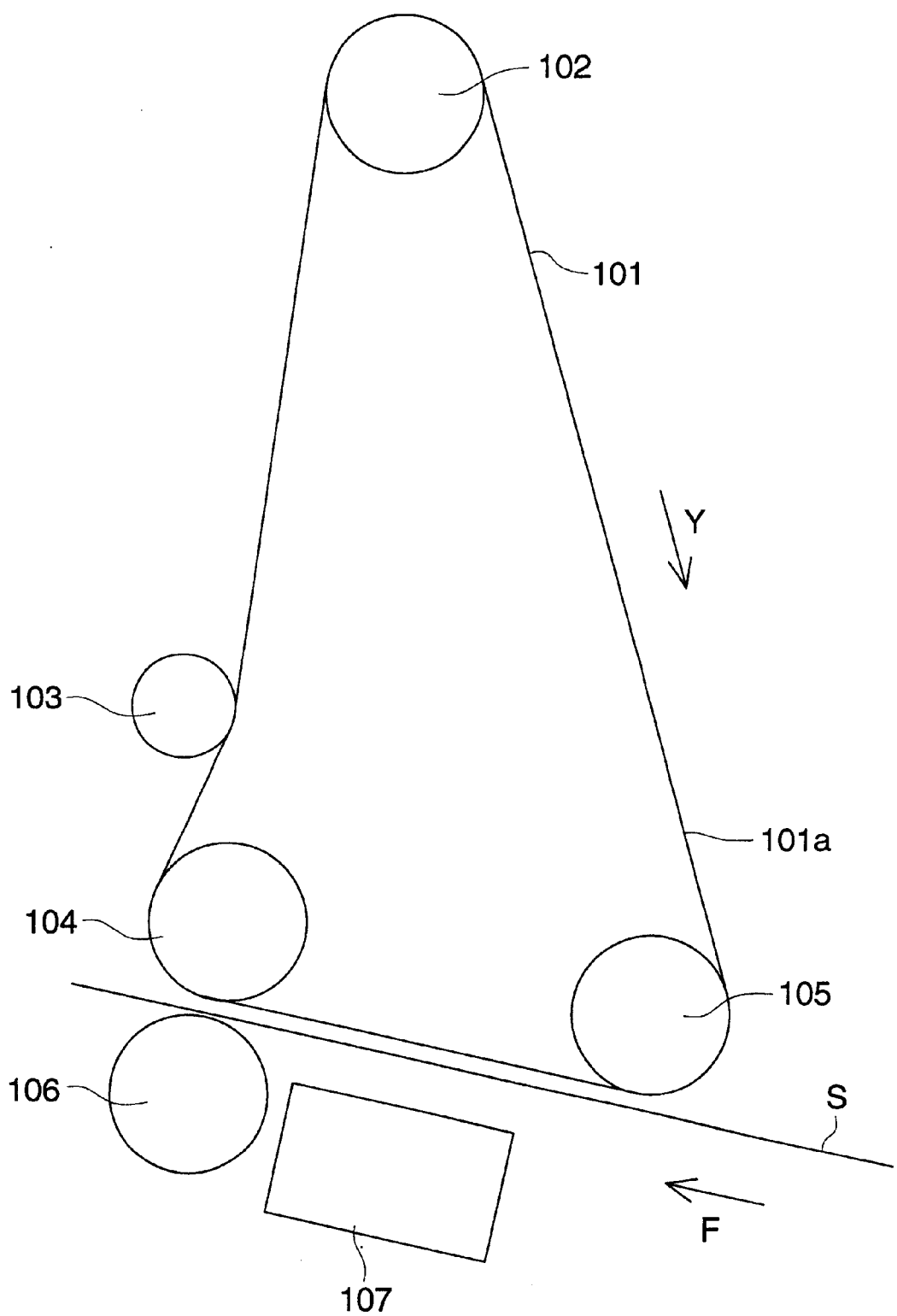
FIG. 11 is a diagram showing a transfer belt and the structure in the vicinity of the transfer belt in an image forming apparatus of the present embodiment.

Next, an example wherein the aforesaid rotation stabilizing device is provided on the rotation driving mechanism for a transfer belt in an image forming apparatus will be explained as follows, referring to FIGS. 11 and 12. In the structure of the example, transfer belt 101 serving as a belt-shaped image carrier of the image forming apparatus is constituted with a photoreceptor as shown in FIG. 11, and an image formed on surface 101a of the transfer belt 101 is transferred by transfer unit 107 onto a transfer sheet which is conveyed in the direction F. The transfer belt 101 is moved in the direction Y by rotation driving of driving roller 102 around driven rollers 103, 104 and 105, while, transfer sheet S is conveyed between driven rollers 106 and 104 in the direction F.

Figure 12:
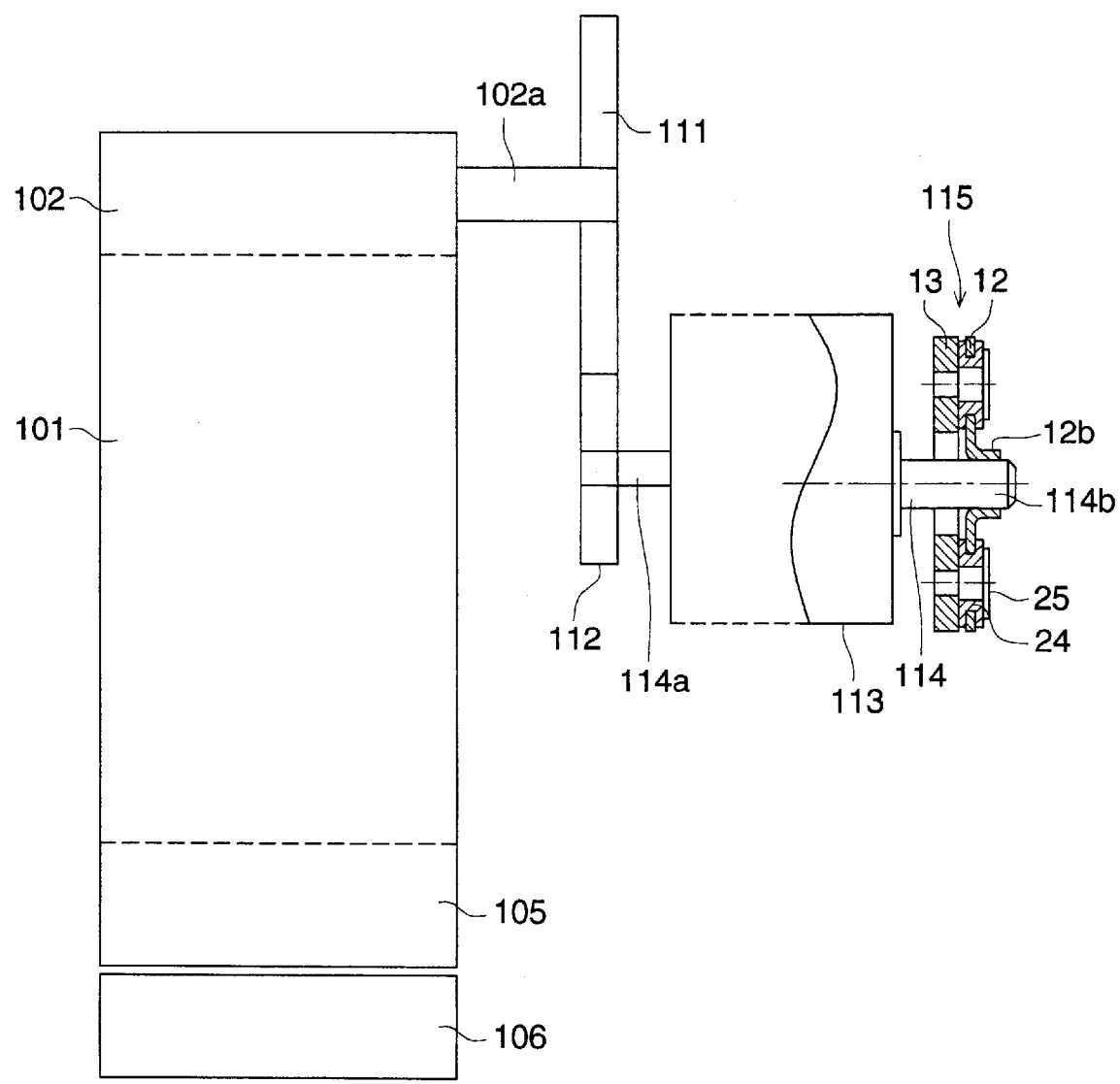
FIG. 12 is a diagram showing a rotation driving mechanism for the transfer belt shown in FIG. 11.

As shown in FIG. 12, with regard to rotation driving roller 102 which drives transfer belt 101 to rotate, its rotary shaft 102a is driven to rotate by motor 113 through gear 111 and gear 112. Gear 112 is connected on the part of one end portion 114a on rotary shaft 114 of the motor 113, and rotation stabilizing device 115 which is the same as the foregoing is connected on the part of the other end portion 114b on the rotary shaft 114.

When the motor 113 drives, rotation driving roller 102 is rotated through rotary shaft 114, gears 112 and 111 and rotary shaft 102a. In this case, even when vibratory force causing fluctuation of rotating speed is caused on the motor 113, the fluctuation of rotating speed is controlled by an action of the rotation stabilizing device 115, and the rotary shaft 114 can rotate stably with its vibration controlled, thus, rotation of the rotation driving roller 102 is stabilized. Therefore, the transfer belt 101 can move at the stable constant speed in the direction Y. Accordingly, image transfer by transfer unit 107 from the transfer belt 101 onto transfer sheet S is conducted stably and firmly, thus, high quality images can be formed.

Since the image forming apparatus equipped with the rotation stabilizing device of the present embodiment requires no complicated control for obtaining excellent image quality as stated above, it is not necessary to use expensive circuits and motors and it is possible to structure with a few parts, which contributes to low cost.

In the past, when fluctuation of rotating speed is caused on an image carrier such as a photoreceptor drum and a transfer belt of an image forming apparatus, image quality is lowered. The cause for this is fluctuation of load applied on the image carrier, and this load fluctuation is not always regular in terms of extent and time. Therefore, it has been impossible to change driving force for the image carrier, estimating load fluctuation. However, by using the rotation stabilizing device of the invention, it is possible to control speed fluctuation caused by load fluctuation, and to stabilize rotation. Thus, the problems can be solved.

Next, referring to FIG. 13(a) and FIG. 13(b), there will be explained an example wherein a rotation stabilizing device identical to the foregoing is provided on a fur brush cleaning unit having a rotation driving mechanism in an image forming apparatus. As shown in FIG. 13(a), in the vicinity of photoreceptor drum 121 of an image forming apparatus of an electrophotographic system, there is arranged cleaner unit 122 which cleans remaining toner on the photoreceptor drum 121 for the succeeding image forming, after a latent image formed on the surface of the photoreceptor drum 121 has been developed with toner. This cleaner unit 122 is provided with cleaning blade 123 for scraping off remaining toner from photoreceptor drum 121 rotating in the direction of arrow mark in the drawing, fur brush 124 which comes in contact with photoreceptor drum 121 at the downstream side of the cleaning blade 123 and cleans on an auxiliary basis, and with toner conveyance screw 125 which conveys scraped toner to the outside of the cleaner unit 122.

As shown in FIG. 13(b), the fur brush 124 whose rotary shaft is supported, at its both ends, by bearing 129 rotatably, is connected to rotary shaft 127a of driving pulley 127 through POM coupling 128 to be driven by the driving pulley 127 to rotate. The driving pulley 127 is driven by a driving motor (not shown) to rotate through belt 127b, and to its rotary shaft 127a, there is connected rotation stabilizing device 126 identical to the foregoing. In the present example, the rotation stabilizing device is not arranged on the part of the driving motor, but is arranged on the part of rotary shaft 127a of driving pulley 127 connected with a rotary shaft of the fur brush 124. However, it is possible to stabilize rotation of a rotary shaft of the fur brush 124 even when speed fluctuation is caused on rotary shaft 127a in the same way as in the foregoing.

The fur brush 124 comes in contact with photoreceptor drum 121, and is mostly the same as the photoreceptor 121 in terms of peripheral speed or has a difference of peripheral speed. When speed fluctuation is caused on the fur brush 124, therefore, the fluctuation is transferred to the photoreceptor drum 121 to cause thereon the speed fluctuation, causing image unevenness. In the present example, however, it is possible to prevent speed fluctuation of fur brush 124 by providing a rotation stabilizing device on the part of a rotary shaft of fur brush 124 as stated above. Thus, speed fluctuation of photoreceptor drum 121 can be prevented, no image unevenness is caused and high image quality can be realized, which is preferable. Incidentally, it is naturally possible to arrange the rotation stabilizing device on the part of a driving motor for driving pulley 127.

Next, referring to FIG. 14, there will be explained an example wherein a rotation driving mechanism employing a stepping motor as a motor in FIG. 9(a) or FIG. 9(b), for example, is used in an image reading apparatus. The image reading apparatus in the drawing is equipped with stepping motor 131 provided with a rotation stabilizing device identical to that in FIG. 9(b), driving pulley 133 which is driven by the stepping motor 131 through timing belt 132 and drives rotary shaft 134 to rotate, wire 135 which is trained about the apparatus and is driven by the rotation of the rotary shaft 134, exposure unit 136 which is driven by the wire 135 in direction X in the drawing, and includes an optical system such as a light source which gives exposure to a document for reading an image from the document and a mirror, and with V-mirror unit 137.

Since a rotation stabilizing device is provided on the stepping motor 131, its rotation is stabilized despite speed fluctuation of the rotation, and movement of the exposure unit 136 and V-mirror unit 137 made by the wire 135 is stabilized, to realize more accurate image reading, which is preferable.

Though the invention has been explained, referring to the embodiment, the invention is not limited to the embodiment stated above, and modification and improvement can naturally made freely. For example, it is possible to consider to attach inertia section 6 directly on photoreceptor drum 1 by omitting flywheel 5. Or, when a disc is made by a member having viscosity and elasticity so that it is stuck between flywheel 5 and inertia section 6, the same effect can be obtained. Further, it is possible to form inertia section 6 itself with a member having viscosity and elasticity to connect it to flywheel 5 with a screw. In addition, an image carrier may also be one like an endless belt trained about a cylindrical member.

It is possible to provide a rotation stabilizing device which is versatile to be used and has high degree of freedom and deters rotation fluctuation for stabilized rotation, and to provide a rotation driving mechanism, an image forming apparatus and an image reading apparatus all equipped with the rotation stabilizing device, Since the rotation stabilizing device of this kind is simple in structure, it is possible to make the rotation stabilizing device to be low in cost and durable in structure.

In the image forming apparatus of the invention having therein a body of rotation equipped with an image carrier which carries an image formed by an image forming means, and a body of vibration attached on the body of rotation through a body of attenuation having viscosity and elasticity, Fluctuation of rotation speed of the body of rotation is controlled by vibration of the body of vibration, and the body of attenuation deforms in accordance with vibration of the body of vibration. Therefore, even when vibratory force causing fluctuation of rotation speed of the body of rotation is generated, this fluctuation of rotation speed is deterred by vibration of the body of vibration, and the fluctuation of speed can be transformed into heat to be converged when the body of attenuation having viscosity and elasticity deforms in accordance with vibration of the body of vibration, thus, an image having high image quality can be formed.

What is claimed is:

1. An image forming apparatus comprising:
   (a) a body of rotation comprising an image carrier, which carries an image formed by an image forming means, and a first disc portion connected to the image carrier through a shaft; and
   (b) a body of vibration comprising a second disc portion attached on the first disc portion of the body of rotation through a body of attenuation having viscosity and elasticity;
   wherein fluctuation of rotating speed of the body of rotation is deterred by vibration of the body of vibration, and the body of attenuation deforms in accordance with vibration of the body of vibration; and
   wherein torsional natural frequency F1 obtained from a spring constant of the body of attenuation and from the moment of inertia of the second disc portion, and torsional natural frequency F2 obtained from a compound spring constant of the shaft connecting the driving system for driving the body of rotation with the first disc portion and from the moment of inertia of the body of rotation, satisfy the following expression $$0.5 \times F2 \leq F1 \leq 2 \times F2.$$

2. The image forming apparatus of claim 1 wherein moment of inertia of the second disc portion is set to the value which is 20% or more of the moment of inertia of the body of rotation.

3. The image forming apparatus of claim 1 wherein moment of inertia of the second disc portion is set to the value which is not less than 30% and not more than 120% of the moment of inertia of the body of rotation.

4. An image forming apparatus comprising:

(a) a body of rotation comprising an image carrier, which carries an image formed by an image forming means; and (b) a body of vibration attached on the body of rotation through a body of attenuation having viscosity and elasticity;

wherein fluctuation of rotating speed of the body of rotation is deferred by vibration of the body of vibration, and the body of attenuation deforms in accordance with vibration of the body of vibration; and wherein an attenuation characteristic of the body of attenuation is expressed by the following expression;

Loss factor $\tan \delta \geq 0.05$.

5. An image forming apparatus comprising:

(a) a body of rotation comprising an image carrier which carries an image formed by an image forming means; and (b) a body of vibration attached on the body of rotation through a body of attenuation having viscosity and elasticity;

wherein fluctuation of rotating speed of the body of rotation is deferred by vibration of the body of vibration, and the body of attenuation deforms in accordance with vibration of the body of vibration; and wherein natural frequency $f=(1/2\pi \cdot \sqrt{K1/12})$ expressed by spring constant K1 of the body of attenuation and by moment of inertia 12 of the body of vibration is set to be smaller than the rotational frequency of the motor that drives the body of rotation and the engagement frequency of the gear that drives the body of rotation.

6. An image forming apparatus comprising:

(a) a body of rotation comprising an image carrier which carries an image formed by an image forming means; and (b) a body of vibration attached on the body of rotation through a body of attenuation having viscosity and elasticity, wherein fluctuation of rotating speed of the body of rotation is deterred by vibration of the body of vibration, and the body of attenuation deforms in accordance with vibration of the body of vibration, and wherein natural frequency $f=(1/290 \cdot \sqrt{K1/12})$ expressed by spring constant K1 of the body of attenuation and by moment of inertia 12 of the body of vibration is set between the rotational frequency of the motor that drives the body of rotation and the engagement frequency of the gear that drives the body of rotation.

7. A rotation driving mechanism comprising:

(a) a rotary stabilizing device comprising:

(1) a rotary member which rotates around a central rotation axis, (2) an inertia member arranged at a position different from that for the rotary member in the axial direction of the central rotation axis, (3) a viscoelastic member having viscosity and elasticity, wherein the rotary member and the inertia member are detachably connected through the viscoelastic member, and wherein the viscoelastic member is provided at a position away from the central rotation axis in a radial direction, and (4) a first rotary shaft which is fixed on the rotary member to rotate solidly with the rotary member;

(b) a rotation driving means;

(c) a second rotary shaft which is connected with the first rotary shaft and rotated together with the rotary member by the rotation driving means;

(d) a rotation transmission mechanism connected with the second rotary shaft; and (e) a rotary drum, with which the rotary member of the rotation stabilizing device is solid, driven by the rotation driving means.

8. An image forming apparatus comprising:

(a) a rotation shaft;

(b) an image carrier, which carries an image formed by an image forming means, fixed on the rotation shaft thereby rotated with the rotation shaft;

(c) a rotary member fixed on the rotation shaft;

(d) an inertia member arranged at a position different from that for the rotary member in the rotation shaft direction;

(e) a viscoelastic member having viscosity and elasticity, wherein the rotary member and the inertia member are detachably connected through the viscoelastic member, and the viscoelastic member is provided at a position away from the rotation shaft in a radial direction.

9. An image reading apparatus comprising:

(a) a rotation shaft;

(b) an exposure unit, which has a light source and a mirror, driven by rotation of the rotation shaft;

(c) a rotary member provided on the rotation shaft;

(d) an inertia member arranged at a position different from that for the rotary member in the rotation shaft direction;

(e) a viscoelastic member having viscosity and elasticity, wherein the rotary member and the inertia member are detachably connected through the viscoelastic member, and the viscoelastic member is provided at a position away from the rotation shaft in a radial direction.

* * * * *